United States Patent [19]
Ellis et al.

[11] 3,755,029
[45] Aug. 28, 1973

[54] PROTECTIVE COATED THERMAL INSULATION

[75] Inventors: Wayne Philip Ellis, Radnor; George Washington Elkins Foster, Jr., Penllyn, both of Pa.; James Roy Allen, Wilmington, Del.

[73] Assignee: Amchem Products, Inc., Ambler, Pa.

[22] Filed: Nov. 17, 1971

[21] Appl. No.: 199,805

Related U.S. Application Data

[63] Continuation-in-part of Ser. No. 811,290, March 28, 1969, abandoned.

[52] U.S. Cl. ...... 156/71, 117/126 AB, 117/126 AQ, 117/161 A, 156/91
[51] Int. Cl. .................................................. F16l 59/12
[58] Field of Search .............................. 156/71, 91; 260/897 C, 889; 117/126 R, 126 AB, 126 AQ, 161 A

[56] References Cited
UNITED STATES PATENTS 3,355,322  11/1967  Worrall et al. ................. 117/126
3,600,469   8/1971  Sato et al. ...................... 260/897 C

OTHER PUBLICATIONS

Wilson, A. C. – Industrial Thermal Insulation, McGraw Hill, N.Y., 1959, pgs. 99, 101, 120, 137–139, 161, 163, 164, 172, 234, 236, 239, 245

Anon., – Thermal Insulation of Pipes and Vessels EEAU Handbook, Constable and Co., London, pgs. 58, 76, 77 & 84

Primary Examiner—Alfred L. Leavitt
Assistant Examiner—Frank Frisenda, Jr.
Attorney—Ernest G. Szoke

[57] ABSTRACT

A composite thermal insulation and protective coating for storage vessels, processing equipment, piping, ducting, and the like comprising mastic coated thermal insulation is constructed by securing to the vessel, pipe, or duct wall a first inner layer of insulation material and a second outer layer of a continuous self-supporting weather resistant flexible mastic coating; said first and second layers being tied to the vessel, pipe, or duct by alternating inner and outer bands. The structural support of said bands in combination with the unusual tensile strength and elastomeric properties of said weather barrier mastic coating permits a completely insulated, weather proofed structure without the necessity of embedding a reinforcing membrane in said mastic with considerable savings in labor and material costs.

6 Claims, 6 Drawing Figures

Patented Aug. 28, 1973

INVENTORS
JAMES ROY ALLEN
WAYNE PHILIP ELLIS
GEORGE WASHINGTON ELKINS FOSTER, JR.

BY

ATTORNEY.

Patented Aug. 28, 1973

INVENTORS
JAMES ROY ALLEN
WAYNE PHILIP ELLIS
GEORGE WASHINGTON ELKINS FOSTER, JR.
BY

ATTORNEY.

Patented Aug. 28, 1973

INVENTORS
JAMES ROY ALLEN
WAYNE PHILIP ELLIS
GEORGE WASHINGTON ELKINS FOSTER, JR.

BY

ATTORNEY.

Patented Aug. 28, 1973

INVENTORS
JAMES ROY ALLEN
WAYNE PHILIP ELLIS
GEORGE WASHINGTON ELKINS FOSTER, JR.

BY

*E. G. Zohe* ATTORNEY.

PROTECTIVE COATED THERMAL INSULATION

This application is a continuation-in-part of application Ser. No. 811,290, filed Mar. 28, 1969, now abandoned.

BRIEF SUMMARY OF THE INVENTION

Heretofore, it has been well known to provide a composite structure for thermally insulating storage vessels, pipes, ducts, and the like which structure comprises multiple layers of insulating materials and one or more protective coatings. Thermal insulation consists of fibrous or cellular material having low thermal conductivity, air or gas filled void spaces and heat reflective surfaces which retard the transfer of heat. Examples, fibrousglass, cellular glass, plastic foam, calcium silicate block. Thermal insulating materials are generally preformed in blocks or sections. Owing to the structural weakness of most thermal insulating materials commonly employed it must be held in place by tying or banding it to the vessel, pipe or the like or by equivalent mechanical attachment. Moreover, since materials having the requisite characteristics for use as thermal insulators are not sufficiently durable to withstand weathering and ordinary environmental attack and in order to seal the joints of the block or preformed sections, there must be applied to the external surface of the thermal insulation a continuous finish which also serves to prevent disintegration of the insulating material. Mastic coatings for thermal insulation consists of film forming compositions which can be applied in thick coats (greater than 30 mils) and cured to form a flexible continuous film on the surface of the insulation. Such coating materials are usually applied by spray or trowel. While the mastic is itself a self-adhesive material, it usually does not develop a strong bond to the insulating material since the insulating material lacks adequate cohesiveness. Accordingly, it is the prevailing practice to interpose a layer of reinforcing membrane between the insulating material and the mastic coating. The membrane reinforcement consists of a woven, knitted, or non-woven fabric which is applied to the insulation by an initial tack coat of mastic and thereafter embedded into the wet tack coat followed by a second coat of mastic to hold the mastic intact, and to provide strength, continuity and impact resistance to the composite insulation protective coating.

It has now been found that a suitable thermal insulating and protective coating can be obtained without employing an intermediate layer of reinforcing membrane and that the composite structure will withstand weathering and impact if the mastic coating is affixed to the vessel or conduit or the like by tying or banding in the same manner as the underlying thermal insulation. Accordingly, it is an object of this invention to eliminate the need for a reinforcing membrane in a combined thermal insulating and protective coating system of the type described herein. Still another object of this invention is to provide a combined thermal insulating and protective coating having greater durability, increased flexibility, greater impact resistance, better weather resistance, a longer working life and simplified installation and repair.

The objects of this invention are accomplished by providing a combined insulating and protective coating system for thermally insulating storage vessels, pipes, ducts, processing equipment and the like which consists of a first inner layer of insulating material immediately adjacent to and banded to the vessel or pipe with a series of circumferential spaced inner bands and a second outer layer consisting of specially chosen mastic completely enveloping the thermally insulated vessel or conduit and having said spaced inner bands embedded therein and which mastic film is also banded with a second series of circumferentially spaced outer bands.

The objects of this invention and how they are achieved can be better understood by reference to the detailed description which follows and when considered in connection with the accompanying drawings wherein.

DETAILED DESCRIPTION OF THE INVENTION

Figure 1:
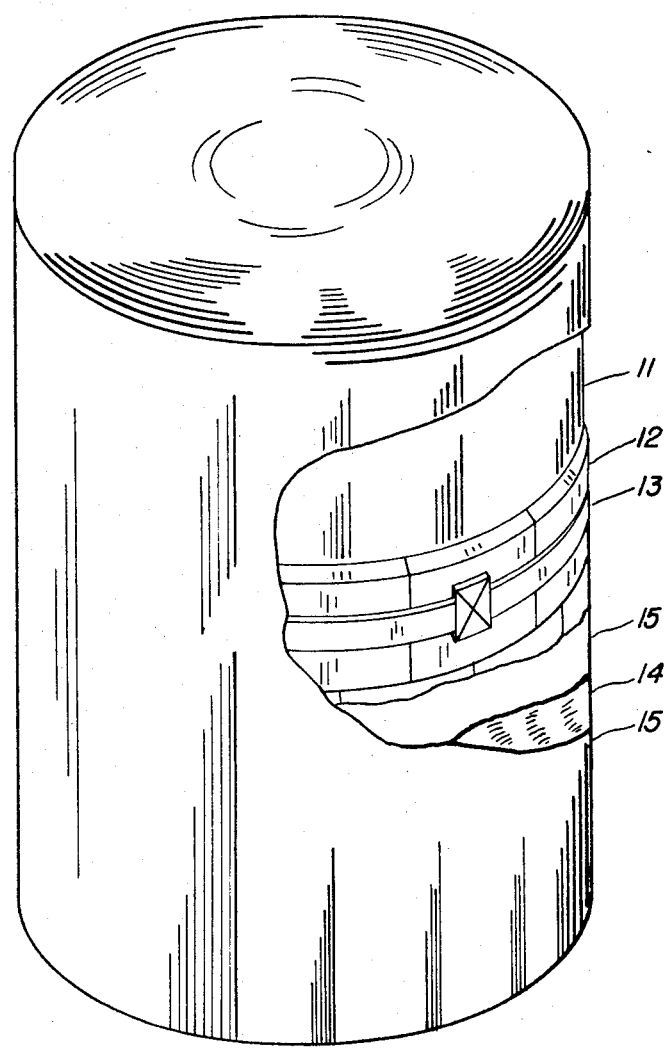
FIG. 1 is a perspective view of an insulated storage vessel according to the prior art with portions eliminated or broken away for the sake of clarity.

Referring to the various figures in the drawings wherein like reference characters refer to like parts there is shown in FIG. 1 a storage vessel having affixed thereon an insulation and protective coating according to the prior art wherein 11 represents the vessel wall, 12 represents blocks of thermal insulation secured to the vessel by bands 13. Covering the entire thermal insulation and embedded in the mastic coating 15 is a woven reinforcement fabric 14. The fabric reinforcement is required in this type structure because of the low cohesive strength of the thermal insulator which renders it unsuitable as an adherent for the mastic coating. In addition to providing a suitable substrate for the mastic the woven fabric 14 also serves to provide "bridging" and to prevent separation of the mastic film at the joints in the thermal insulator upon thermal contraction of the insulation blocks.

Figure 2:
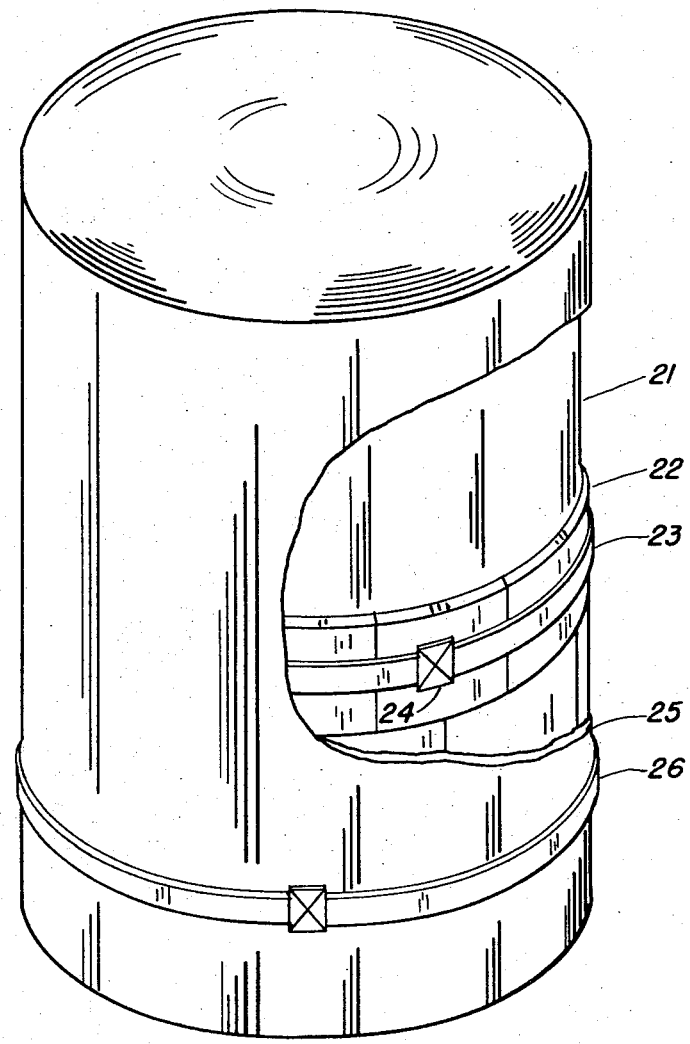
FIG. 2 is a perspective view of an insulated storage vessel according to this invention with portions eliminated or broken away.

FIG. 2 shows a thermal insulation structure according to this invention in which the reinforcing membrane has been eliminated without sacrificing any of the advantages attributable thereto and with several added advantages. As show in FIG. 2, a thermal insulation system according to this invention comprises a vessel wall 21 covered with a thermal insulating layer 22 composed of blocks of thermal insulating material secured to the vessel by a system of spaced circumferential inner bands 23, the ends of which are joined together by conventional fastening means such as buckle or clip fasteners 24. Enveloping the entire layer of thermal insulation and having said inner band system embedded therein is a continuous pliable outer mastic coating 25, secured to the vessel by a second outer system of circumferential bands 26 generally spaced intermediate of said inner bands 23 so as to provide additional support for the layer of thermal insulation 22. Said outer bands are adhered to and preferably partially embedded in the mastic coating so as to maintain them at uniformly spaced intervals. The thermal insulation layer is comprised of one of the usual industrial type insulating materials generally available in blocks of established sizes or in preformed shaped sections. Such blocks or shaped sections are attached to the vessel or pipe to be covered by conventional anchoring techniques for example, by means of a temporary adhesive or metal fasteners such as welded pins, etc., and thereafter secured to the vessel or conduit by banding with appropriately spaced straps of metal, plastic, fabric or the like. Banding of the insulating material is necessary in view of the inherent structural weakness of the usual industrial insulating materials. Such materials lack the mechanical fasteners such as screws, etc. This lack of mechanical strength also renders it difficult to obtain durable adhesion between the thermal insulating material and the outer coating of protective mastic and for this reason it has been necessary in the past to use an intermediate layer of reinforcing fabric. According to this invention, however, it has been found that the specially chosen mastic coating 25 can be applied directly to the layer of thermal insulation. The mastic composition which is ordinarily comprised of a film forming polymer dispersed in water or in an organic solvent with other conventional ingredients such as pigments, binders, fillers, plasticizers and the like to form a semi-fluid coating of relatively high solids content can be applied to the ordinary thermal insulators in wet coat thicknesses of between about 15 and 50 mils (preferably about 30 mils). Even thicker coatings (up to 70 and 80 mils) can be applied where the insulating material is sufficiently strong or in other cases by applying the mastic in multiple coats.

The preferred mastics for use in the composite structure of this invention has the following composition:

a. an ethylene/vinylacetate copolymer in a concentration of from about 24 to about 38 percent by weight;

b. a plasticizer in a concentration of from about ½ to about 3 percent by weight, or about 0.015 to about 0.125 parts per part of ethylene vinylacetate;

c. a coalescing agent in a concentration of from about ½ to about 2½ percent by weight, or about 0.013 to about 0.1 parts per part of ethylene vinylacetate;

d. a surfactant in a concentration of from about ½ to about 2 percent by weight, or about 0.013 to about 0.08 parts per part of ethylene vinylacetate;

(e) pigment and fillers in a concentration of from about 25 to about 45 percent by weight, or about 0.65 to about 2.0 parts per part of ethylene vinylacetate, with at least 5 to 10 percent of said fillers being asbestos, or about 0.13 to about 0.44 parts of asbestos per part of ethylene vinylacetate, said asbestos consisting Group 7 (or Type 7R) asbestos fibers;

f. water in a concentration of at least from 20 to 35 percent by weight, or about 0.5 to about 1.5 parts per part of ethylene vinylacetate with the proviso that the concentration of all the ingredients totals 100 percent by weight.

Suitable mastics of this type are for example, those sold under the trade-marks Foster GPM and Foster Monolar Mastic available from Benjamin Foster Company, a Division of Amchem Products Inc., Ambler, Pa. More particularly acceptable mastics for the practice of this invention are the water based mastics exemplified by the following compositions:

| ingredient/content | Examples | | | |
|---|---|---|---|---|
| by weight | I | II | III | IV |
| copolymer | 34.99 | 31.39 | 29.95 | 34.27 |
| freeze-thaw stabilizer | 1.05 | 0.95 | 0.90 | 1.55 |
| coalescing agent | 1.59 | 1.42 | 1.36 | 2.07 |
| non-ionic surface active agent | 1.06 | 0.95 | 0.90 | 1.55 |
| e. pigments | | | | |
| TiO$_2$ | 4.21 | 3.77 | 3.60 | 4.12 |
| calcium carbonate | 19.71 | 27.97 | 31.28 | 19.30 |
| asbestos | 6.97 | 6.26 | 5.97 | 6.83 |
| f. water | 28.62 | 25.68 | 24.50 | 28.04 |
| g. pigment dispersant | 1.06 | 0.95 | 0.91 | 1.55 |
| h. defoamer | 0.21 | 0.19 | 0.18 | 0.20 |
| j. fungicide | 0.53 | 0.47 | 0.45 | 0.52 |
| Total | 100.00 | 100.00 | 100.00 | 100.00 |

Example V

| | % by WT. |
|---|---|
| AIRFLEX 500* (ethylene/vinylacetate copolymer emulsion sold by Air Products and Chmicals Co., New York, New York) copolymer | 27.28 |
| water | 22.28 |
| Ethylene glycol | 0.82 |
| Butyl carbitol acetate | 1.23 |
| TRITON X405 (t-octylphenol polyether alcohol surfactant sold by Rohm and Haas Co., Philadelphia, Pennsylvania) | 0.82 |
| KEY X10 (stabilized organo-tin preservative sold by Key Chemicals, Corp., Miami Springs, Florida) | 0.41 |
| HODAG PV 108 (defoamer sold by Hodag Chemical Corp., Chicago, Illinois) | 0.16 |
| CHLOROWAX 70 (resinous chlorinated paraffin fire-retardant sold by Diamond Alkali Co., Cleveland, Ohio) | 9.18 |
| Total pigment and fillers (asbestos, calcium carbonate, titanium dioxide, antimony oxide) | 37.00 |
| CALGON T (Zn/Na hexametaphosphate used as pigment dispersant, sold by Clagon Inc., Pittsburgh, Pennsylvania) | 0.82 |

* The specific copolymers employed in the illustrative examples are by way of illustration only and it will be readily apparent to those skilled in the art that other ethylene vinylacetate copolymers having the characteristic properties of the exemplified copolymers can be substituted therefor.

EXAMPLE VI

| | % by Wt. |
|---|---|
| ELVACE 1872 (ethylene/vinylacetate copolymer emulsion sold by duPont Co., Wilmington, Delaware) copolymer | 29.85 |
| water | 24.42 |
| Ethylene glycol | 0.98 |
| Butyl carbitol acetate | 1.36 |
| TRITON X405 (t-octylphenol polyether alcohol surfactant sold by Rohm Haas Co., Philadelphia, Pa.) | 0.91 |
| KEY X10 (stabilized organo-tin preservative sold by Key Chemical Corp., Miami Springs, Florida) | 0.47 |
| HODAG PV 108 (defoamer sold by Hodag Chemical Corp., Chicago, Illinois) | 0.18 |
| CHLOROWAX 70 (resinous chlorinated paraffin fire-retardant sold by Diamond Alkali Co., Cleveland, Ohio) | 9.02 |
| Titanium dioxide | 3.09 |
| Antimony oxide | 1.06 |
| Calcium carbonate | 23.57 |
| Asbestos | 4.16 |
| CALGON T (Zn/Na hexametaphosphate used as pigment dispersant, sold by Calgon Inc., Pittsburgh, Pennsylvania) | 0.91 |

Solvent based mastics are exemplified by the following composition:

EXAMPLE VII

| | % by Wt. |
|---|---|
| Chlorosulfonated rubber (available from duPont Co. under the name Hypalon) | 10 to 20 |
| Chlorinated hydrocarbon resin | 7 to 9 |
| Tri basic lead maleate | 6 to 7 |
| Pigment and fillers (7R asbestos 2 to 4% pigment 7 to 8% inert fillers remainder) | 7 to 14 |
| Solvent (high flash naptha) | 50 to 70 |

The mastic is conveniently applied by spray or by trowelling to the desired thickness. After the mastic has been applied to the desired thickness and sufficiently cured the mastic coat is banded with spaced circumferential outer bands 26 in a manner similar to the banding used in the case of the thermal insulating material. The so formed composite thermal insulator provides a protective coating structure with high bond strength, i.e., resistance against tension, compression, peel, impact, cleavage or shear and which can withstand prolonged weathering. For example finishes constructed in this way easily withstand 1,000 hours exposure in the carbonarc Weather-Ometer. If desired, there can be optionally employed heavy strength fibrated pressure sensitive tapes applied over any joints in the insulation or other stress sites where rupture of the coating is likely to occur as for example the odd configurations which may be caused by the shape of the insulated vessels or pipes or combinations thereof. In the case of pipe and tanks having a diameter less than about 48 inches the enveloping mastic finish is sufficiently self-supporting so that the outer bands 26 are unnecessary and can, if desired, be omitted from vessels and pipes of less than 48 inches in diameter.

Figure 3:
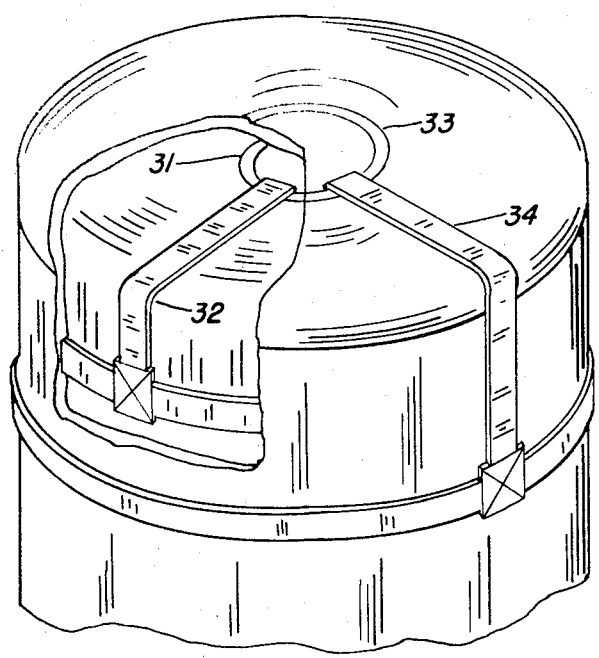
FIG. 3 is a top view of an insulated storage vessel.

FIG. 3 illustrates the banding systems for use on the ends of a cylindrical vessel or with a conical or spherical vessel or variations thereof. A small loop of inner banding material 31 has attached thereto one end of each of the radial strips of the inner banding material 32 the other ends of which are attached to a circumferential inner band at spaced intervals as shown in FIG. 2 and near the top of the vessel. A system of outer bands consisting of loop 33 and radial bands 34 is similarly disposed on the outer surface of the mastic coating. The employment of similar banding for spherical vessels will be immediately apparent to those skilled in the art. The spacing of both the inner and outer band will generally be determined by the intensity of weather and environmental conditions to which the coating structure is to be exposed though ordinarily it has been found that inner bands can be spaced about 8 to 18 inches apart and outer bands can be spaced about 18 to 24 inches apart.

Figure 4:
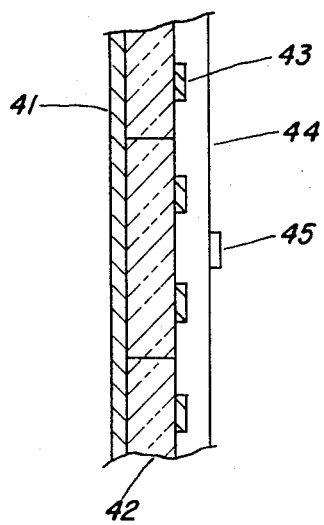
FIG. 4 is a fragmentary sectional view showing details of the composite thermal insulation, protective coating and banding system.

FIG. 4 depicts the composite thermal insulation protective coating system of this invention in cross section wherein 41 represents the wall of the vessel, pipe or the like. 42 represents the thermal insulation which may be any of the usual industrial insulating materials, preferably a resilient thermal insulating cellular material such as calcium silicate, fibrous glass, polyurethane, polystyrene and the like. 43 represents a cross section of an inner circumferential band which may be fabricated from metal, e.g., steel or an alloy, plastic, plastic coated metal or other suitable material. Metal bands ordinarily are preferred. The inner band may be of various width and thickness though ordinarily it will suffice to use a band from about 15 to about 30 mils thick and from about 50 to about 100 mils wide. The spaced circumferential bands 43 are embedded in a flexible polymeric outer coating adhered to said inner layer of thermal insulation. The flexible polymeric coating is a cured mastic film shown in cross section in FIG. 4 and designated 44. The mastic finish must be resistant to deterioration by weather elements such as rain, sleet, snow, wind, severe temperature changes and solar radiation without cracking, peeling, becoming brittle, blistering or otherwise disintegrating. Furthermore, it must be impact resistant and resistant to mild industrial acids, alkalies, salt and their vapors and should be fire resistant. The required mastic composition will consist essentially of a polymeric emulsion in water or solution in an organic solvent, a plasticizer, a surfactant, a coalescing agent, pigments, fillers, including asbestos fibers, fire retardants, defoamers, preservatives, thickeners, etc. Especially preferred are mastics prepared from an aqueous emulsion of an ethylene vinylacetate copolymer. 45 represents a cross section of an outer band which can be conveniently made of plastic, and which in a preferred embodiment is at least partially impressed into the polymeric coating 44. As indicated hereinabove, the outer banding is optional where the diameter of the vessel or pipe is less than about 48 inches in diameter. In either case, however, the entire insulation and finish composition are held securely in contact with the vessel wall and will adapt to any movement of the supporting vessel wall without disruption of the outer mastic finish due to the elastomeric properties of the chosen mastic composition. Other banding materials such as metal, plastic or fabric coated metal, woven fabric, coated fabrics, etc., can also be employed. The outer bands 45 are generally of about the same characteristics as the inner bands 43 though plastic is generally preferred as the construction material for outer banding.

The particular type of mastic coating required by this invention is the most critical requirement essential to the performance of the finished thermally insulated structure described above. Prior art mastic compositions do not provide all the properties necessary for successful performance when assembled as described above. In fact, prior art mastic compositions are designed from the outset to be used in conjunction with a reinforcing membrane embedded in the wet mastic on application. The type of mastic composition described above for use in this invention permits the elimination of the extra labor and material costs of embedding reinforcing membrane. This is possible because of the unusually beneficent conbination of tensile strength, elongation, and recovery from stretching that the preferred mastic compositions possess in the cured state; and the high solids content and resistance to flow in the wet state allows a minimum of shrinkage on curing and bridging of the insulation butt joints.

The following tables will help to demonstrate why the mastic compositions preferred are superior to prior art compositions:

TABLE I

| Polymer formulated in prior art mastic compositions* | Tensile strength in PSI | % Elongation | % Recovery from breaking point | Toughness index** |
|---|---|---|---|---|
| Asphalt emulsion | 332 | 2.8 | 45 | 26 |
| Polyvinyl acetate (PVA) (Formula 1) | 95 | 112 | 66 | 359 |
| PVA (Formula 2) | 76 | 393 | 39 | 1008 |
| PVA (Formula 3) | 50 | 98 | 64 | 332 |
| Acrylic | 555 | 27 | 100 | 508 |
| Vinyl-Acrylic | 134 | 767 | 44 | 3485 |
| Ethylene vinyl acetate (EVA) | 106 | 209 | 78 | 752 |
| Chloro sulfonated rubber (Hypalon) duPont R | 798 | 73 | 100 | 1650 |

*All ⅛ inch wet films cured 11 days at 75°F and 50% R.H. (not 100% cured)
** The energy required to break cured mastic film in millions of ERGS/sq. in.

Ideal performance for a mastic would be a toughness index of over 500 million ergs/sq. in., 100 percent elongation or better before breaking, and 100% recovery after stretching to the breaking point. Only the polymers in the preferred compositions approach this ideal.

Even more revealing are the same compositions after 1000 hours of artificial weathering in an Atlas carbon arc Weather-O-Meter (films 100 percent cured and weathered 1000 hours).

TABLE II

| Polymer formulated in prior art mastic compositions | Tensile strength in PSI | % Elongation | % Recovery from breaking point | Toughness index |
|---|---|---|---|---|
| Asphalt emulsion | 437 | 3 | 0 | 27 |
| PVA (Formula 1) | 895 | 21 | 97 | 6413 |
| PVA (Formula 2) | 458 | 38 | 84 | 590 |
| PVA (Formula 3) | 1171 | 18 | 100 | 632 |
| Acrylic | 593 | 28 | 95 | 563 |
| Vinyl-acrylic | Film destroyed after 500 hours weathering | | | |
| Preferred polymer mastic compositions | | | | |
| EVA | 525 | 113 | 99 | 2006 |
| Chlorosulfonated rubber(Hypalon)duPont* | 758 | 130 | 100 | 1521 |

After weathering, only the preferred polymers retain all desirable properties. To further demonstrate the superiority of the preferred mastic, compare performance of 100 percent cured PVA (formula 3) with nylon membrane and preferred EVA formula without membrane:

TABLE III

| Polymer | Tensile strength in PSI | % Elongation | % Recovery | Toughness index |
|---|---|---|---|---|
| EVA composition (no membrane) | 309 | 203 | 81 | 1887 |
| PVA (Formula 3) (with nylon membrane) | 777 | 30 | 46 | 7905 |

Comparison with Table I shows how nylon membrane improves PVA (formula 3) performance, but EVA formula without membrane has near ideal performance. In fact, the presence of membrane is detrimental to elongation and recovery of the PVA mastic.

Asbestos fibers are a necessary ingredient of the mastic formulation. The fibrous quality of asbestos fillers performs a two-fold function in the mastic weather barrier. In the wet state, asbestos fibers act as a viscosity and flow-control agent imparting a heavy, plastic-like consistency to the wet mastic and thixotropic flow properties. This allows the mastic to be applied in a thick, single coat of about 75 to 125 mils wet coverage without sag. The thixotropy provides for bridging of insulation butt joints up to ¼ inch width. In the cured mastic, the asbestos provides some degree of reinforcing strength. Type 7R (or Group 7) milled asbestos fibers are chosen since longer fibers tend to decrease tensile strength in the cured film and shorter fibers do not provide sufficient thixotropy in the wet state.

Finally, the solids content of the mastic must be high. After volatiles have evaporated, 65–75 percent of the total mastic should remain in the cured film. Prior art weather barrier mastics are in general only 50 to about 60 percent in solids content. High solids are necessary to provide sufficient bridging of insulation butt joints and a thicker, stronger dry film after curing at same wet coverage of conventional coatings.

The composite coating of this invention lends itself to repair much more readily than previous structures. In the event the mastic coating is ruptured or peels so as to create a break in the continuous coating structure it can be easily and conveniently restored by simply applying the mastic in the usual manner, e.g. trowelling to the damaged area. The mastic will cure to form a bond with the originally emplaced coating thus restoring the composite coating structure to its original condition.

Figure 5:
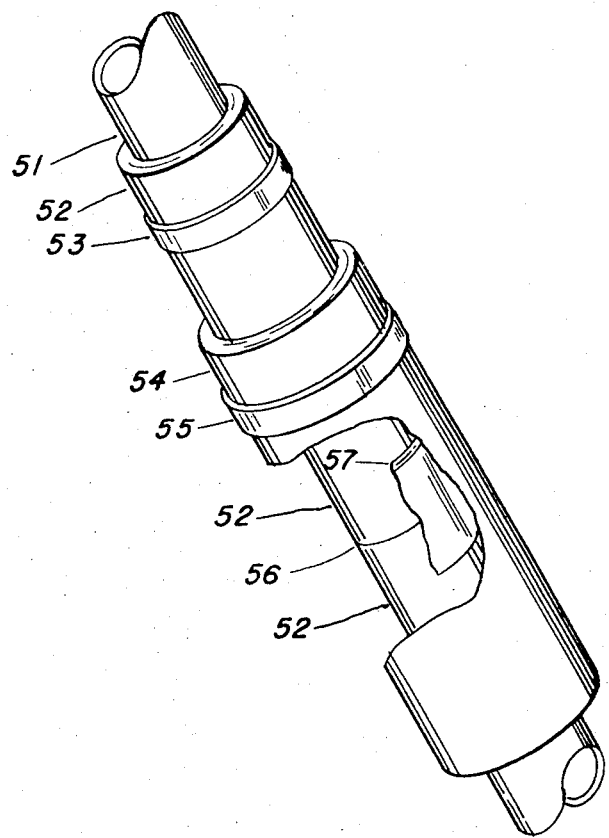
FIG. 5 is a perspective view of an insulated pipe with portions eliminated or broken away.

FIG. 5 illustrates the composite structure of this invention as applied to a metal pipe. As in the case of FIG. 2, the cutaway portion illustrates the pipe wall 51, the inner layer of preformed sections of thermal insulating material 52, inner circumferential bands 53, a continuous outer layer of mastic 54, and an outer band system 55. If desired, sections of pipe can be made up with the insulating material attached to the individual sections of pipe prior to installation. In such cases a butt joint in the insulation layer will coincide with a joint in the pipe shown for example as 56 in FIG. 5, and in order to assure the integrity of the continuous mastic finish it is preferred to apply a circumferential strip of woven membrane tape 57 to provide reinforcement for the coating at the insulation joint.

Figure 6:
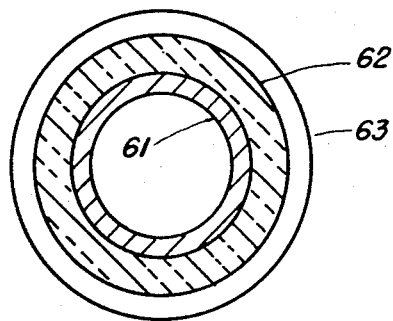
FIG. 6 is a cross section of an insulated pipe.

The cross sectional view of an insulated pipe shown in FIG. 6 comprises the pipe wall 61, the layer of insulation 62, and mastic 63.

From the foregoing detailed description and the attached drawings those skilled in the art will be able to construct and utilize this invention for the intended purpose under a wide variety of service conditions.

We claim:

1. A method of forming a composite thermal insulating and protective coating covering for storage vessels, fluid processing equipment and conduits and attaching said covering thereto which comprises banding a layer of preformed insulating material to the exterior wall of the storage vessel, processing equipment or pipe by means of uniformly spaced radial and circumferential inner bands; applying to said banded layer of thermal insulation a continuous pliable outer coating of a mastic composition of a semi-fluid coating incorporating a synthetic weather resistant elastomer, so as to completely envelop and adhere to said banded layer of thermal insulation, the mastic composition, consisting essentially of an ethylene vinyl acetate copolymer in a concentration of from about 24 percent to about 38 percent by weight, a plasticizer in a concentration of from about one-half percent to about 3 percent by weight, a coalescing agent in a concentration of from about one-half percent to about 2 and one-half percent by weight, a surfactant in a concentration of from about one-half percent to about 2 percent by weight, pigment and fillers in a concentration of from about 25 percent to about 45 percent by weight, and water in a concentration from about 20 percent to 35 percent by weight, said mastic being applied in a single coat of about 75 to 125 mls. wet coat thickness having 65 percent to 75 percent solids content of which about 5 percent to about 10 percent by weight comprises asbestos fibers fine enough to pass through a sieve of 10 mesh USSS, said inner bands being embedded in said mastic coating; hardening said mastic coating by evaporation of the volatile solvent or water in said coating and at least partial curing of said elastomer to form an envelope of flexible and compressible elastomeric weather resistant protective coating and thereafter banding said protective coating by means of uniformly spaced peripheral outer bands spaced generally intermediate of said inner bands and partly impressed into the outer protective coating.

2. A combined thermal insulation and protective coating composition consisting essentially of a layer of thermal insulating material adapted to enclose a continuous supporting walled vessel said thermal insulation layer encircled by at least one continuous inner band; a continuous flexible jointless synthetic elastomeric protective coating adhesively bound to and entirely enveloping said banded layer of thermal insulation, said elastomeric coating being formed by curing in situ a film of mastic applied as a single coat of about 75 to about 125 mils wet coat thickness having 65 percent to 75 percent solids content of which about 5 percent to about 10 percent by weight comprises asbestos fibers fine enough to pass through a sieve of 10 mesh USSS, said inner band being embedded in the protective coating and at least one continuous outer band encircling said protective coating and securing it to the supporting vessel.

3. A combined thermal insulation and protective coating composition consisting essentially of a layer of thermal insulating material adapted to enclose an elongated conduit said thermal insulation layer encircled by at least one continuous inner band; a continuous flexible synthetic elastomeric protective coating adhesively bound to and entirely enveloping said banded layer of thermal insulation, said elastomeric coating being formed by curing in situ a film of mastic applied as a single coat of about 75 to about 125 mils wet coat thickness having 65 percent to 75 percent solids content of which about 5 percent to about 10 percent by weight comprises asbestos fibers fine enough to pass through a sieve of 10 mesh USSS, said inner band being embedded in the protective coating and at least one continuous outer band encircling said protective coating and securing it to the supporting pipe.

4. A combined thermal insulation and protective coating structure for covering storage vessels, fluid processing equipment and conduits comprising in combination a layer of thermal insulating material and a layer of a continuous synthetic elastomeric weather resistant film adhered thereto, said elastomeric coating being formed by curing in situ a film of mastic applied as a single coat of about 75 to about 125 mils wet coat thickness having 65 percent to 75 percent solids content of which about 5 percent to about 10 percent by weight comprises asbestos fibers fine enough to pass through a sieve of 10 mesh USSS; and having uniformly spaced metal bands interposed between said thermal-insulating layer and said elastomeric coating such that one face of said metal band is adjacent the thermal-insulating material and the remaining faces are embedded in the inner surface of said elastomeric coating and a second set of metal bands adhered to and partially embedded in the outer surface of said elastomeric coating.

5. A combined thermal insulation and protective coating structure according to claim 4 wherein the elastomeric coating is a cured film obtained from a water based mastic composition comprising:
  a. an ethylene/vinylacetate copolymer in a concentration of from about 24 percent to about 38 percent by weight;
  b. a plasticizer in a concentration of from about one-half percent to about three percent by weight, or about 0.015 to about 0.125 parts per part of ethylene vinylacetate;
  c. a coalescing agent in a concentration of from about one-half percent to about two and one-half percent by weight, or about 0.013 to about 0.1 parts per part of ethylene vinylacetate;
  d. a surfactant in a concentration of from about one-half percent to about two percent by weight, or about 0.013 to about 0.08 parts per part of ethylene vinylacetate;
  e. pigment and fillers in a concentration of from about 25 percent to about 45 percent by weight, or about 0.65 to about 2.0 parts per part of ethylene vinylacetate 6. A combined thermal insulation and protective coating structure according to claim 4 wherein the elastomeric coating in a cured film obtained from a solvent based mastic composition comprising; about 10 percent to about 20 percent by weight of chlorosulfonated rubber, about seven percent to about nine percent by weight of chlorinated hydrocarbon resin, about six percent to about seven percent by weight of tri basic lead maleate about seven percent to about 14 percent by weight of pigment and filler materials and about 50 percent to about 70 percent by weight of high flash naptha solvents.

* * * * *